Aug. 13, 1946.   R. B. SMITH ET AL   2,405,909
METHOD OF PRODUCING THREADED SPIRAL TUBES
Filed Aug. 22, 1942
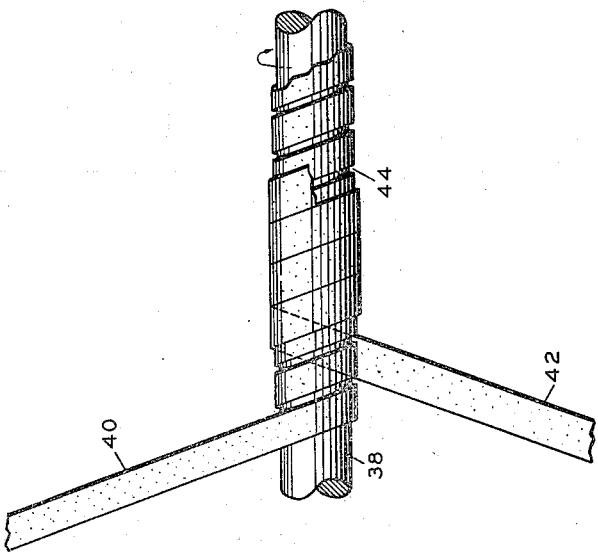
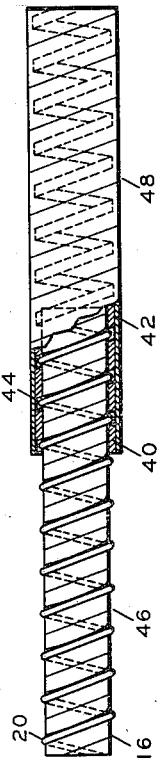
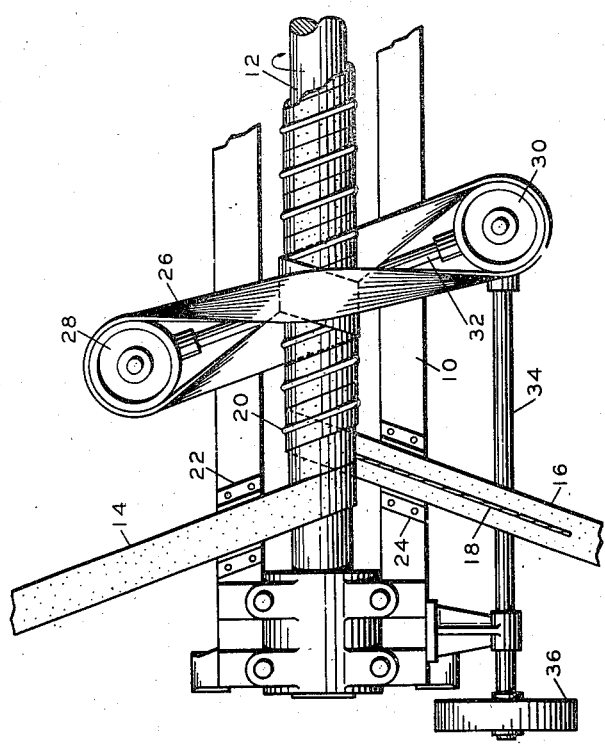
Roscoe B. Smith
Minor W. Latimer
INVENTORS
BY *Cleveland B. Hollabaugh*
ATTORNEY Patented Aug. 13, 1946

2,405,909

UNITED STATES PATENT OFFICE 2,405,909

METHOD OF PRODUCING THREADED SPIRAL TUBES

Roscoe B. Smith, Wilmington, Del., and Minor W. Latimer, Joplin, Mo., assignors to Hercules Powder Company, Wilmington, Del., a corporation of Delaware Application August 22, 1942, Serial No. 455,756

2 Claims. (Cl. 93—94)

This invention relates to a method of producing spiral wound tubes and more particularly to spiral tubes and sleeves therefor having a threaded relationship.

The manufacture of spiral tubes in two or more plies of various diameters is well understood and practiced in the art, as is also cut-off mechanism for cutting tubes so produced into desired length. The operation is continuous, delivering tubes at a high rate of production.

Now in accordance with the present invention there is provided a method for manufacturing threaded spiral tubes and sleeves therefor in a continuous manner, the external threads being formed by feeding a strand, wire or cord, between layers of the spiral tube, thereby forming an external thread-like protrusion on the outer surface of the tube, and the internal threads being formed by winding the inner layer of the sleeve in spaced relationship thereby forming a thread-like recess on the inner surface of the sleeve.

The primary object of the present invention is to provide a method for manufacturing threaded spiral tubes and sleeves therefor in a continuous manner with a minimum amount of effort on the part of the operator and without requiring any special operating skill.

Other objects of the invention will appear hereinafter, the novel features and combinations being set forth in the appended claims.

One embodiment for carrying out the invention is presented herein for the purpose of illustration but it will, of course, be understood that the invention is susceptible to different modified embodiments which come equally within the scope of the appended claims.

In the accompanying drawing:

Fig. 1 is a fragmentary view in plan of a conventional spiral tube machine illustrating the application of the invention in forming external threads on a tube being wound.

Fig. 2 is a fragmentary view in plan of a mandrel for use with the machine shown in Fig. 1, illustrating the application of the invention in forming internal threads on a tube being wound.

Fig. 3 is a view, partly in elevation and partly in section illustrating the threaded relationship of tubes formed in accordance with the invention.

Referring now to Fig. 1 of the drawing in detail, a bench 10 supports a rigid mandrel 12. A strip 14 from a stock supply (not shown) is fed on the mandrel 12. Simultaneously a strip 16 from a stock supply (not shown) and a cord 18 from a stock supply (not shown) is fed over the strip 14 on the mandrel 12. The cord 18 is disposed between the layer formed by the strip 14 and the layer formed by the strip 16 thereby forming a thread-like protrusion 20 on the outer surface of the tube being formed. Adjustable guide elements 22 and 24 serve to maintain the strips 14 and 16, respectively, in proper alignment so that the adjacent edges of the strips will abut each other. Suitable means (not shown) are employed to maintain the cord 18 substantially centrally of the strip 16 as well as to properly tension said cord during the winding operation.

Adhesive is applied to the inner surface of the strip 16 by suitable means (not shown) thereby forming an integral tube.

Winding and advancing of the tube thus formed on the mandrel 12 is effected by an endless belt 26 which is obliquely trained around the mandrel. The belt engages a pair of pulleys 28 and 30 which are rotated in unison by suitable gearing associated with the cross shaft 32. Power is transmitted to the pulleys 28 and 30 by suitable gearing associated with the drive shaft 34 which has a driven pulley 36 affixed thereto. When the tube is advanced to a certain position a cutter (not shown) engages the tube and advances therewith while cutting the tube to a desired length. This permits the end of the tube to be cut at a right angle to its longitudinal axis.

Referring now to Fig. 2 of the drawing the method for forming a sleeve having internal threads compatible with the external threads described above will be set forth. The same machine as that illustrated in Fig. 1 is utilized with certain adjustments made thereo to accommodate the mandrel 38 which is slightly larger than the mandrel 12. This increase in size of the mandrel should be just enough to provide a fit between the male and female tubes. The adjustment of the machine to accommodate the larger mandrel will not be described as it is well understood in the art. Only such adjustments and features as are pertinent to the present invention will be described.

A strip 40 from a stock supply (not shown) is fed on the mandrel 38. This strip is of such width as to be wound in an open layer, the space between adjacent sides of the strip being of such width as to accommodate an external thread, such as the thread-like protrusion 20. Simultaneously, a strip 42 from a stock supply (not shown) is fed over the strip 40 on the mandrel 38, thereby forming a thread-like recess 44 on the inner surface of the tube being formed. The guide elements 22 are adjusted to maintain the strip 40 in proper alignment to form the thread, and the guide elements 24 are also adjusted to accommodate the strip 42 and maintain it in proper alignment so that the adjacent edges of the strip will abut each other.

Adhesive is applied to the inner surface of the strip 42 by suitable means (not shown) thereby forming an integral tube. Winding, advancing, and cutting of the tube thus formed to a desired length is accomplished in the same manner as that described above for the making of tubes with external threads.

Referring now to Fig. 3 of the drawing a tube 46 is shown in threaded engagement with a tube 48. The thread-like protrusion 20 is in the form of a knuckle thread while the thread-like recess 44 is in the form of a square thread. This arrangement provides a substantial interlocking of the threaded portions and a pitch that enables a rapid building up of composite sections.

This method of producing a spiral wound threaded tubes is of particularly utility in the explosive art. In this application the inner tube provided with external threads is made into an explosive cartridge. The outer tube provided with internal threads is made into a sleeve. The explosive cartridge is then screwed into the sleeve about half-way and a second explosive cartridge is screwed into the other end of the sleeve, then another sleeve is screwed upon the protruding portion of the preceding explosive cartridge, etc. until the made-up sections form a rigid column. This arrangement is of particular utility to geophysicists for carrying out seismic work, as the rigid column of explosive can be loaded readily and easily through bridged and sandy holes. Furthermore, a blasting cap can be placed in any cartridge in the column, and it gets the extra protection of the full-length sleeve.

It is evident that there are numerous factors which will influence the method conditions for the most satisfactory operation of the invention, the actual limits of which conditions cannot be established except by a detailed study of each set of materials to be used in making the tubes. For example, in seismic work the required rigidity of a built-up column of cartridges and sleeves as well as the amount of explosive to be utilized will dictate the size and construction of the cartridges and sleeves. The number of plies are inconsequential as long as the inner layer and external layer of the plies are utilized, respectively, to form the internal and external threads. Furthermore, where a built-up column of catridges and sleeves is subjected to severe compression and/or tensile stress, the cartridges and sleeves may be constructed having double or multiple threads. The double or multiple threads will better enable the built-up column to withstand the possibility of shear or disengagement of the threaded elements.

Although the preferred method of forming the external thread is by feeding a cord, or the like, between the tube body and a strip supplied with adhesive, other materials, such as chipboard, may be employed to form the external thread. The chip-board, or other suitable material, may be secured to the tube body by glue or it may be secured to the tube body by an over-lay procedure such as that employed when utilizing a cord.

It will be seen, therefore, that this invention actually may be carried out by the use of various modifications and changes without departing from its spirit and scope, and that the invention comprises an economical and expedient method for the manufacture of threaded spiral tubes.

What we claim and desire to protect by Letters Patent is:

1. A method for the production of threaded spiral tube on a continuous spiral tube machine which comprises continuously feeding strip material onto a rigid mandrel and into engagement with a driven endless belt which is obliquely trained around said mandrel and which winds and advances the strip material in the form of a spiral tube; and simultaneously therewith continuously feeding a cord and strip material provided with adhesive over the spiral tube and into engagement with the driven endless belt, said cord being disposed between said spiral tube and said strip material provided with adhesive and forming a thread-like protrusion upon engagement with the driven endless belt which firmly presses the strip material provided with adhesive to the spiral tube and permits the area covering the cord to protrude thereby forming a thread-like protrusion on the exterior surface of the spiral tube.

2. A method for the production of threaded spiral tube on a continuous spiral tube machine which comprises continuously feeding strip material in abutting relationship to itself onto a rigid mandrel and into engagement with a driven endless belt which is obliquely trained around said mandrel and which winds and advances the strip material in the form of a spiral tube; and simultaneously therewith continuously feeding a cord and strip material provided with adhesive over the spiral tube and into engagement with the driven endless belt, the strip material provided with adhesive being fed in abutting relationship to itself, the said cord being disposed between said spiral tube and said strip material provided with adhesive and forming a thread-like protrusion upon engagement with the driven endless belt which firmly presses the strip material provided with adhesive to the spiral tube and permits the area covering the cord to protrude thereby forming a thread-like protrusion on the exterior surface of the spiral tube.

ROSCOE B. SMITH.
MINOR W. LATIMER.